(12) United States Patent
Calpito

(10) Patent No.: US 12,381,291 B2
(45) Date of Patent: Aug. 5, 2025

(54) COLLECTOR-PLATE AND WIRE-BOND INTERCONNECTIONS FOR BATTERY MODULE

(71) Applicant: Atieva, Inc., Newark, CA (US)

(72) Inventor: DodgieReigh M. Calpito, Fairfield, CA (US)

(73) Assignee: Atieva, Inc., Newark, CA (US)

( * ) Notice: Subject to any disclaimer, the term of this patent is extended or adjusted under 35 U.S.C. 154(b) by 249 days.

(21) Appl. No.: 17/650,755

(22) Filed: Feb. 11, 2022

(65) Prior Publication Data

US 2023/0261339 A1    Aug. 17, 2023

(51) Int. Cl.
| | |
|---|---|
| *H01M 50/54* | (2021.01) |
| *H01M 50/505* | (2021.01) |
| *H01M 50/547* | (2021.01) |
| *H01M 50/566* | (2021.01) |

(52) U.S. Cl.
CPC ......... *H01M 50/54* (2021.01); *H01M 50/505* (2021.01); *H01M 50/547* (2021.01); *H01M 50/566* (2021.01)

(58) Field of Classification Search
None
See application file for complete search history.

(56) References Cited

U.S. PATENT DOCUMENTS

| | | |
|---|---|---|
| 6,367,685 B1 | 4/2002 | Jiang et al. |
| 2019/0312251 A1 | 10/2019 | Matthews |
| 2023/0095885 A1 | 3/2023 | Lee et al. |

FOREIGN PATENT DOCUMENTS

| | | |
|---|---|---|
| EP | 2973782 B1 | 10/2019 |
| WO | 2019052425 A1 | 3/2019 |
| WO | 2019052426 A1 | 3/2019 |
| WO | 2022005032 A1 | 1/2022 |

OTHER PUBLICATIONS

International Search Report and Written Opinion for PCT Application No. PCT/US2023/062391, mailed on May 23, 2023, 12 pages.

*Primary Examiner* — Matthew T Martin
*Assistant Examiner* — Ankith R Sripathi
(74) *Attorney, Agent, or Firm* — Brake Hughes Bellermann LLP

(57) ABSTRACT

A battery module comprises: electrochemical cells arranged in rows with terminals in a coplanar arrangement, the electrochemical cells including first and second terminals of opposite polarity at respective first ends of the electrochemical cells; a busbar and a plurality of bond wires, each of the bond wires coupling the first terminal of a respective one of the electrochemical cells to the busbar; and a collector plate including tabs, each of the tabs coupled to the second terminal of a respective one of the electrochemical cells.

8 Claims, 3 Drawing Sheets

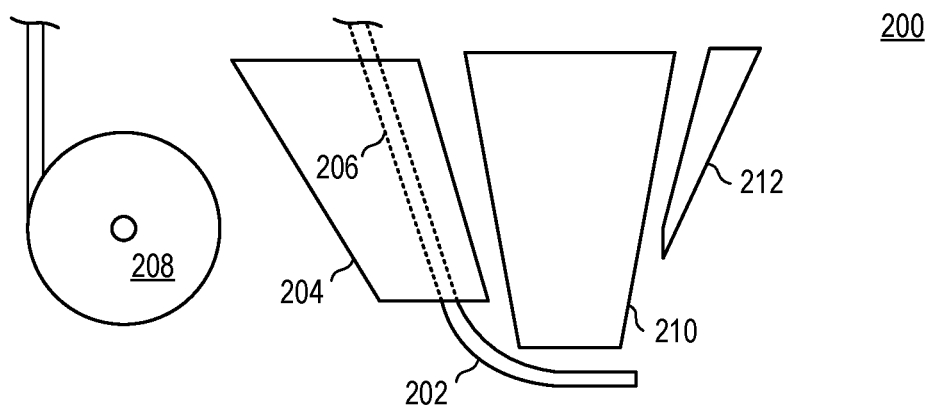
FIG. 2
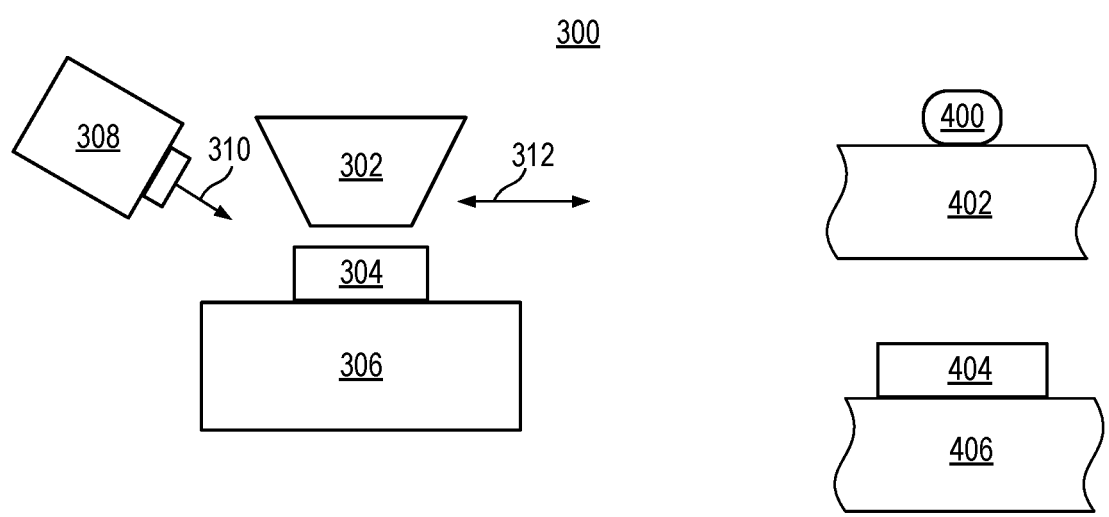
FIG. 3
FIG. 4

COLLECTOR-PLATE AND WIRE-BOND INTERCONNECTIONS FOR BATTERY MODULE

TECHNICAL FIELD

This document relates to collector-plate and wire-bond interconnections for a battery module.

BACKGROUND

In recent years, the world's transportation has begun a transition away from powertrains primarily driven by fossil fuels and toward more sustainable energy sources, chiefly among them electric motors powered by on-board energy storages. Vehicle makers are striving to increase efficiency and utility of such vehicles, including the performance of energy storages such as battery packs.

SUMMARY

In a first aspect, a battery module comprises: electrochemical cells arranged in rows with terminals in a coplanar arrangement, the electrochemical cells including first and second terminals of opposite polarity at respective first ends of the electrochemical cells; a busbar and a plurality of bond wires, each of the bond wires coupling the first terminal of a respective one of the electrochemical cells to the busbar; and a collector plate including tabs, each of the tabs coupled to the second terminal of a respective one of the electrochemical cells.

Implementations can include any or all of the following features. The busbar forms a first coplanar finger, and wherein the collector plate forms a second coplanar finger, and wherein the first and second coplanar fingers are coplanar with each other. The first and second coplanar fingers are interleaved with each other. The first terminals are center terminals of the electrochemical cells. The second terminals are rim terminals of the electrochemical cells. The first terminals are positive terminals of the electrochemical cells. The second terminals are negative terminals of the electrochemical cells. At least one of the tabs is coupled to the second terminal of more than one of the electrochemical cells.

In a second aspect, a method comprises: arranging electrochemical cells in rows with terminals in a coplanar arrangement, the electrochemical cells including first and second terminals at respective first ends of the electrochemical cells; coupling each bond wire of a plurality of bond wires to the first terminal of a respective one of the electrochemical cells and to a busbar; and coupling each tab of a collector plate to the second terminal of a respective one of the electrochemical cells.

Implementations can include any or all of the following features. The busbar forms a first coplanar finger, and wherein the collector plate forms a second coplanar finger. The first and second coplanar fingers are interleaved with each other. The first terminals are center terminals of the electrochemical cells. The second terminals are rim terminals of the electrochemical cells. The first terminals are positive terminals of the electrochemical cells. The second terminals are negative terminals of the electrochemical cells. Coupling the bond wires to the first terminals involves a wirebonding process. Coupling the tabs to the second terminals involves a laser welding process. Coupling the tabs to the second terminals involves an ultrasonic welding process.

BRIEF DESCRIPTION OF DRAWINGS

FIG. 2 shows an example of a wire bonder head that can be used in forming wire bonds.
FIG. 3 shows an example of a system that can be used in attaching tabs of collection plates to terminals of electrochemical cells.
FIG. 4 shows examples of a bond wire coupled to a terminal of a cell, and a tab of a collector plate coupled to a terminal of a cell.

Like reference symbols in the various drawings indicate like elements.

DETAILED DESCRIPTION

Figure 1:
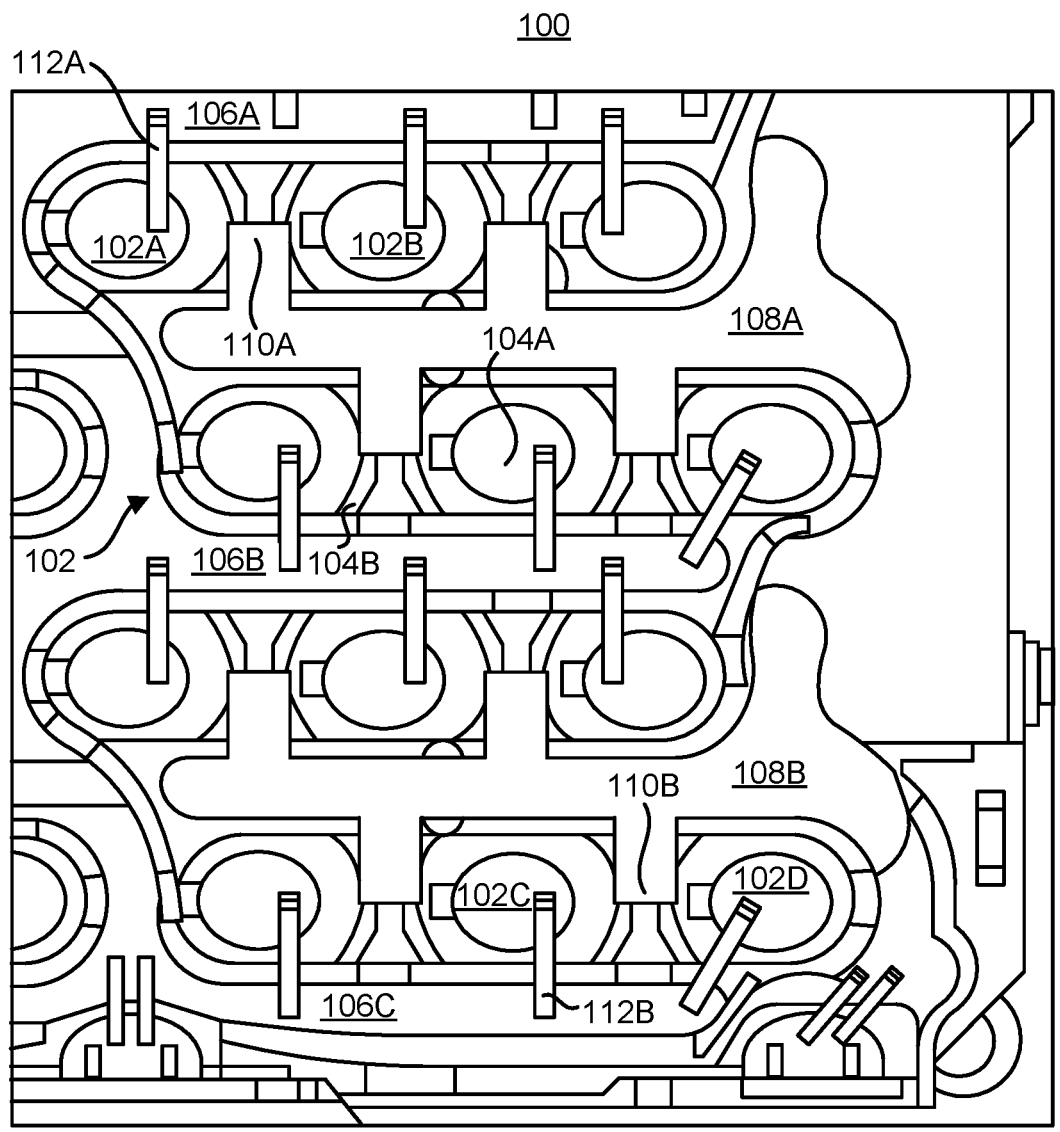
FIG. 1 shows an example of a battery module.

This document describes examples of systems and techniques relating to collector-plate and wire-bond interconnections for a battery module. In some implementations, a hybrid solution can be used where terminals of one polarity are coupled to a busbar by bond wires, and terminals of an opposite polarity, located at the same end of the cell as the other terminals, are coupled to a collector plate by way of respective tabs on the collector plates. The present subject matter can facilitate—for example by way of a hybrid approach—decreased resistance and/or improved thermal conductivity while charging or discharging the cells, while continuing to provide a fusible interconnect (e.g., a ribbon or other bond wire) that is configured to fuse and thereby interrupt the flow of electricity in the event of an overcurrent.

Examples herein refer to forming a bond between two or more conductive materials. As used herein, a bond can be formed by any technique that joins the materials so that electric current can flow between them. Ultrasonic wirebonding and/or laser wirebonding can be used, to name just two examples. A presence of a bond between materials indicates that the materials are electrically coupled to each other, which is here referred to as them being coupled.

Examples herein refer to electrochemical cells. As used herein, an electrochemical cell is a device that generates electrical energy from chemical reactions, or uses electrical energy to cause chemical reactions, or both. An electrochemical cell can include an electrolyte and two electrodes to store energy and deliver it when used. In some implementations, the electrochemical cell can be a rechargeable cell. For example, the electrochemical cell can be a lithium-ion cell. In some implementations, the electrochemical cell can act as a galvanic cell when being discharged, and as an electrolytic cell when being charged. The electrochemical cell can have at least one terminal for each of the electrodes. The terminals, or at least a portion thereof, can be positioned at one end of the electrolytic cell. For example, when the electrochemical cell has a cylindrical shape, one of the terminals can be provided in the center of the end of the cell, and the can that forms the cylinder can constitute the other terminal and therefore be present at the end as well. Other shapes of electrochemical cells can be used, including, but not limited to, prismatic shapes.

Examples herein refer to a battery module, which is an individual component configured for holding and managing multiple electrochemical cells during charging, storage, and use. The battery module can be intended as the sole power source for one or more loads (e.g., electric motors), or more than one battery module of the same or different type can be used. Two or more battery modules can be implemented in a system separately or as part of a larger energy storage unit. For example, a battery pack can include two or more battery modules of the same or different type. A battery module can include control circuitry for managing the charging, storage, and/or use of electrical energy in the electrochemical cells, or the battery module can be controlled by an external component. For example, a battery management system can be implemented on one or more circuit boards (e.g., a printed circuit board).

Examples herein refer to a busbar, and a battery module can have at least one busbar. The busbar is electrically conductive and is used for conducting electricity to the electrochemical cells when charging, or from the cells when discharging. The busbar is made of an electrically conductive material (e.g., metal) and has suitable dimensions considering the characteristics of the electrochemical cells and the intended use. In some implementations, the busbar comprises aluminum (e.g., an aluminum alloy). A busbar can be planar (e.g., flat) or can have one or more bends, depending on the shape and intended use of the battery module. The busbar can be configured for placing electrochemical cells in a serial arrangement, or in a parallel arrangement, or in a serial and parallel arrangement.

Examples herein refer to bond wires (e.g., ribbon bond wires, or ribbon wires, or other electrical conductors). As used herein, a bond wire can have any number of different geometries, and can include one or more materials having respective conductivities. For instance, a bond wire can be a single layered bond wire, or can be a multi-layered bond wire that has a plurality of layers each having a respective conductivity. In some implementations, a bond wire can be a ribbon wire having a rectangular cross-section and having one or more layers. The one or more layers can include one or more electrically conductive materials, such as one or more metals and/or metal alloys. A bond wire can include, but is not limited to, copper, aluminum, a copper alloy, an aluminum alloy, and/or a combination thereof. As used herein, a bond wire being coupled to a surface (e.g., a conductive surface, electrical contact surface, etc.) refers to the bond wire being electrically and/or physically coupled with that surface, unless otherwise indicated.

Examples herein refer to a top or a bottom. These and similar expressions identify things or aspects in a relative way based on an express or arbitrary notion of perspective. That is, these terms are illustrative only, used for purposes of explanation, and do not necessarily indicate the only possible position, direction, and so on.

FIG. 1 shows an example of a battery module 100. The battery module 100 can be used with one or more other examples described elsewhere herein. The battery module 100 includes electrochemical cells 102. The electrochemical cells 102 can have any of multiple form factors, and are here shown with a cylindrical shape as an example. For example, the cylindrical shape forms an essentially circular profile at the end that is visible in the illustration. The electrochemical cells 102 can have terminals at the end. Here, each of the electrochemical cells 102 has a center terminal 104A and a rim terminal 104B, both at the end that is shown in the illustration. That is, the center terminal 104A can be located in the middle of the circular profile and the rim terminal 104B can be located at the edge of the circular profile. In some implementations, the center terminals 104A and the rim terminals 104B are of opposite polarity from each other. For example, the center terminal 104A can be a positive terminal and the rim terminal 104B can be a negative terminal.

The electrochemical cells 102 can be arranged in rows. For example, a row of cells can extend vertically or horizontally in the plane of the present illustration. The electrochemical cells 102 can have the center terminals 104A and/or the rim terminals 104B in a coplanar arrangement. For example, the center terminals 104A can all be essentially coplanar with each other in the plane of the present illustration. As another example, the rim terminals 104B can all be essentially coplanar with each other in the plane of the present illustration.

The battery module 100 can include one or more busbars for conducting electricity to or from the electrochemical cells 102. In the present example as illustratively shown, a busbar 106A can be characterized as a top busbar, a busbar 106B can be characterized as a middle busbar, and a busbar 106C can be characterized as a bottom busbar. In some implementations, two or more of the busbars 106A-106C can be coupled to each other. For example, all of the busbars 106A-106C can be part of a common busbar in the battery module 100. In some implementations, one or more of the busbars 106A-106C can form coplanar fingers. For example, all of the busbars 106A-106C can form coplanar fingers that in the present illustration extend from left to right in the plane of the image. In some implementations, one or more of the busbars 106A-106C can be interleaved with another conductive structure in the battery module 100.

The battery module 100 can include one or more collector plates for conducting electricity to or from the electrochemical cells 102. In the present example as illustratively shown, a collector plate 108A can be characterized as an upper collector plate, and a collector plate 108B can be characterized as a lower collector plate. In some implementations, the collector plates 108A-108B can be coupled to each other. In some implementations, one or more of the collector plates 108A-108B can form coplanar fingers. For example, each of the collector plates 108A-108B can form a respective coplanar finger that in the present illustration extends from right to left in the plane of the image. In some implementations, one or more of the collector plates 108A-108B can be interleaved with another conductive structure in the battery module 100.

One or more coplanar fingers of a busbar can be interleaved with one or more coplanar fingers of a collector plate. For example, the coplanar finger of the collector plate 108A is interleaved with the coplanar fingers of the busbars 106A-106B. As another example, the coplanar finger of the collector plate 108B is interleaved with the coplanar fingers of the busbars 106B-106C. As another example, the coplanar finger of the busbar 106B is interleaved with the coplanar fingers of the collector plates 108A-108B. Other approaches can be pursued.

A collector plate can include an essentially planar structure of a conductive material. In some implementations, the collector plate has a thickness that is essentially the same throughout the collector plate. For example, the collector plate can be cut, stamped, or otherwise machined from a sheet of metal stock. A collector plate can include one or more tabs for conducting electricity to or from the electrochemical cells 102. In some implementations, the tab(s) can extend on either or both sides of a coplanar finger. Here, a tab 110A of the collector plate 108A extends perpendicular to the coplanar finger—in the plane of coplanarity—in a direction toward the busbar 106A. The tab 110A can be coupled to one or more terminals. Here, the tab 110A is coupled to the rim terminal of a cell 102A and to the rim terminal of a cell 102B.

Here, a tab 110B of the collector plate 108B extends perpendicular to the coplanar finger—in the plane of coplanarity—in a direction toward the busbar 106B. Other tabs can also or instead be used. The tab 110B can be coupled to one or more terminals. Here, the tab 110B is coupled to the rim terminal of a cell 102C and to the rim terminal of a cell 102D.

The battery module 100 can include bond wires for conducting electricity to or from the electrochemical cells 102. The bond wires are coupled to terminals of one or more of the electrochemical cells 102. For example, bond wires can be coupled to rim terminals, or center terminals, of cells having a cylindrical form factor. Here, a bond wire 112A is coupled to the busbar 106A and to the center terminal of the cell 102A. Similarly, a bond wire 112B is coupled to the busbar 106C and to the center terminal of the cell 102C. Other approaches can be used.

FIG. 2 shows an example of a wire bonder head 200 that can be used in forming wire bonds. The wire bonder head 200 can operate using a supply of bond wire 202. The wire bonder head 200 and/or the bond wire 202 can be used with one or more other examples described elsewhere herein. The wire bonder head 200 includes a wireguide 204. The wireguide 204 is used for guiding (e.g., feeding) the bond wire 202 in a bonding operation. The wireguide 204 can be made of one or more materials, including, but not limited to, a metal or a synthetic material. A supply 206 of the bond wire 202 is seen as passing through the wireguide 204. In some implementations, the supply 206 of the bond wire 202 can be provided from a spool 208. For example, the spool 208 can be rotatably suspended in relation to the wire bonder head 200 so as to allow the supply 206 of the bond wire 202 to be obtained in a continuous or intermittent fashion, and such that the bond wire 202 has a particular orientation relative to an electrochemical cell for bonding.

The wire bonder head 200 includes a wedge 210. The wedge 210 can be used to bond the bond wire 202 to an electrochemical cell or to a busbar (not shown). For example, the wedge 210 can be made of metal.

The wire bonder head 200 includes a cutter 212. The cutter 212 can be used to sever the bond wire 202 before, during, or after bonding. For example, the cutter 212 can be made of metal.

FIG. 3 shows an example of a system 300 that can be used in attaching tabs of collection plates to terminals of electrochemical cells. The system 300 or components thereof can be used with one or more other examples described elsewhere herein. The system 300 includes a bonder head 302 that will be applied to a tab 304 for bonding to a substrate 306. In some implementations, the tab 304 can be attached to the substrate 306 by way of a laser welding process. For example, a laser 308 can generate a laser beam 310 that applies heat for melting so as to form at least one weld joint between the tab 304 and the substrate 306. The power of the laser 308 is controlled so that a reliable weld joint is formed without excessive heat transfer into the substrate 306. The bonder head 302 can apply clamping pressure.

In some implementations, the tab 304 can be attached to the substrate 306 by way of an ultrasonic welding process. For example, the bonder head 302 can be subjected to ultrasonic vibrations, as schematically illustrated by an arrow 312, which vibrations generate heat for melting so as to form at least one weld joint between the tab 304 and the substrate 306. The power of the ultrasonic vibrations is controlled so that a reliable weld joint is formed without excessive heat transfer into the substrate 306.

The substrate 306 can be a terminal of an electrochemical cell. In some implementations, the tab 304 can be coupled to a positive or negative cell terminal. For example, the terminal can be a rim terminal, or a center terminal, of a cell having a cylindrical shape.

FIG. 4 shows examples of a bond wire 400 coupled to a terminal 402 of a cell, and a tab 404 of a collector plate coupled to a terminal 406 of a cell. One or more of these examples can be used with one or more other examples described elsewhere herein. For example, the terminal 402 can be a rim terminal, or a center terminal, of a cell having a cylindrical shape. As another example, the terminal 406 can be a rim terminal, or a center terminal, of a cell having a cylindrical shape. The terminals 402 and 406 in the above examples can be part of the same cell or different cells.

Figure 5:
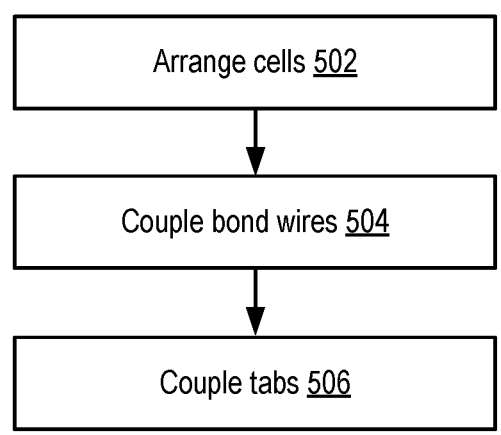
FIG. 5 shows an example of a method.

FIG. 5 shows an example of a method 500. The method 500 can be used with one or more other examples described elsewhere herein. More or fewer operations than shown can be performed. Two or more operations can be performed in a different order unless otherwise indicated.

At an operation 502, the method 500 can include arranging electrochemical cells in rows with terminals in a coplanar arrangement. For example, the cells 102 (FIG. 1) having a cylindrical form factor can be arranged substantially as shown. The electrochemical cells include first and second terminals (e.g., center and rim terminals, respectively) at respective first ends of the electrochemical cells.

At an operation 504, the method 500 can include coupling each bond wire of a plurality of bond wires to the first terminal of a respective one of the electrochemical cells and to a busbar. For example, in FIG. 1 the bond wire 112A can be coupled to the busbar 106A and to the center terminal of the cell 102A, and the bond wire 112B can be coupled to the busbar 106C and to the center terminal of the cell 102C.

At an operation 506, the method 500 can include coupling each tab of a collector plate to the second terminal of a respective one of the electrochemical cells. For example, in FIG. 1 the tab 110A can be coupled to the rim terminal of the cell 102A and to the rim terminal of the cell 102B, and the tab 110B of the collector plate 108B can be coupled to the rim terminal of the cell 102C and to the rim terminal of the cell 102D.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A battery module comprising:
   electrochemical cells arranged in rows with terminals in a coplanar arrangement, the electrochemical cells including first and second terminals of opposite polarity at respective first ends of the electrochemical cells;
   a busbar and a plurality of bond wires, each of the bond wires coupling the first terminal of a respective one of the electrochemical cells to the busbar; and
   a collector plate including tabs, wherein each of the tabs is integrally formed in the collector plate, each of the tabs coupled to the second terminal of a respective one of the electrochemical cells, wherein the busbar forms a first coplanar finger extending in a first direction between a first end and a second end of the first coplanar finger, wherein the first coplanar finger is connected to the busbar at the first end and not at the second end, wherein the first coplanar finger has a first length from the first end to the second end that is greater than a cumulative extent along the first coplanar finger of at least two of the electrochemical cells that are adjacent each other, wherein the collector plate forms a second coplanar finger extending in a second direction between a first end and a second end of the second coplanar finger, wherein the second direction is opposite to the first direction, wherein the second coplanar finger has a second length from the first end to the second end that is greater than a cumulative extent along the second coplanar finger of at least two of the electrochemical cells, wherein the first and second coplanar fingers are coplanar with each other, and wherein the first and second coplanar fingers are parallel and interleaved with each other such that the first and second lengths extend alongside each other.

2. The battery module of claim 1, wherein the first terminals are center terminals of the electrochemical cells.

3. The battery module of claim 1, wherein the second terminals are rim terminals of the electrochemical cells.

4. The battery module of claim 1, wherein the first terminals are positive terminals of the electrochemical cells.

5. The battery module of claim 1, wherein the second terminals are negative terminals of the electrochemical cells.

6. The battery module of claim 1, wherein at least one of the tabs is coupled to the second terminal of more than one of the electrochemical cells.

7. The battery module of claim 6, wherein each of the tabs is coupled to the second terminals of a respective pair of the electrochemical cells positioned adjacent each other.

8. The battery module of claim 1, wherein the busbar forms multiple first coplanar fingers, and wherein the collector plate forms multiple second coplanar fingers, and wherein the multiple first coplanar fingers and the multiple second coplanar fingers are coplanar with each other, wherein the multiple first coplanar fingers extend in the first direction and the multiple second coplanar fingers extend in the second direction opposite to the first direction, and wherein the multiple first coplanar fingers and the multiple second coplanar fingers are parallel and interleaved with each other such that respective lengths of the multiple first coplanar fingers and of the multiple second coplanar fingers extend alongside each other.

* * * * *